(12) United States Patent
Humburg

(10) Patent No.: US 6,638,031 B1
(45) Date of Patent: Oct. 28, 2003

(54) HEATING SYSTEM FOR MOTOR VEHICLES INCLUDING MULTI-FUNCTION PUMP WITH AXIALLY DISPLACEABLE IMPELLER

(75) Inventor: Michael Humburg, Göppingen (DE)

(73) Assignee: J. Eberspächer GmbH & Co., Esslingen (DE)

( * ) Notice: Subject to any disclaimer, the term of this patent is extended or adjusted under 35 U.S.C. 154(b) by 0 days.

(21) Appl. No.: 10/030,662

(22) PCT Filed: Apr. 12, 2000

(86) PCT No.: PCT/EP00/03261

§ 371 (c)(1),
(2), (4) Date: Nov. 6, 2001

(87) PCT Pub. No.: WO00/68032

PCT Pub. Date: Nov. 16, 2000

(30) Foreign Application Priority Data

May 6, 1999 (DE) ............................................ 199 21 010
Feb. 12, 2000 (DE) ............................................ 100 06 396

(51) Int. Cl.⁷ ................................................ F04B 23/00
(52) U.S. Cl. ................. 417/313; 417/286; 237/12.3 B; 237/12.3 C
(58) Field of Search ................................ 417/286, 292, 417/313, 426; 237/12.3 B, 21.3 C

(56) References Cited

U.S. PATENT DOCUMENTS 4,392,777 A * 7/1983 Huttlin ........................ 415/131
5,564,627 A    10/1996 Veitenhansl ............. 237/123 B
5,906,177 A *  5/1999 Okabe et al. .................. 122/26
6,105,876 A *  8/2000 Hennrich et al. ......  237/12.3 B

FOREIGN PATENT DOCUMENTS

DE    42 29 608 C1    9/1992
DE    44 46 152 A1   12/1994

* cited by examiner

Primary Examiner—Cheryl J. Tyler
Assistant Examiner—John Belena

(57) ABSTRACT

The invention relates to a heating system, particularly for motor vehicles, in which a heat exchange arrangement operating in the manner of a heating member can be thermally coupled by means of a hydraulic heat transfer circuit, particularly a water circuit, to a first heat source, in particular an internal combustion motor serving to drive the motor vehicle, and also to a second heat source, in particular a burner operable independently of the first heat source, wherein a control arrangement can be changed over, in dependence on the operating state of a first pump allocated to the first heat source, between a first state, in which the heat transfer medium or at least a greater portion of it is conducted over both heat sources, and a second state, in which the heat transfer medium is conducted by a further, hydrodynamic pump, only or preponderantly over the second heat source.

17 Claims, 4 Drawing Sheets

HEATING SYSTEM FOR MOTOR VEHICLES INCLUDING MULTI-FUNCTION PUMP WITH AXIALLY DISPLACEABLE IMPELLER

CROSS-REFERENCES TO RELATED APPLICATIONS

This application claims prior benefit from German application 100 06 396.9 filed on Feb. 12, 2000 and German application 199 21 010.1 filed on May 6, 1999.

BACKGROUND OF THE INVENTION

1. Technical Field

The invention relates to a heating system, particularly for motor vehicles, in which a heat exchange arrangement operating in the manner of a heating member can be thermally coupled by means of a hydraulic heat transfer circuit, particularly a water circuit, to a first heat source, in particular an internal combustion motor serving to drive the motor vehicle, and also to a second heat source, in particular a burner operable independently of the first heat source, wherein a control arrangement can be changed over, in dependence on the operating state of a first pump allocated to the first heat source, between a first state, in which the heat transfer medium or at least a greater portion of it is conducted over both heat sources, and a second state, in which the heat transfer medium is conducted by a further, hydrodynamic pump, only or preponderantly over the second heat source.

2. Technology

Such heating systems are fundamentally known and are built into motor vehicles in mass production. The control device operates with valves or thermostats in order, in dependence on the operating conditions at any given time, either to switch over to the so-called large circuit, which includes both heat sources, or to the so-called small circuit, which leads only over the second heat source. If necessary, a mixed circuit can also be switched in, in which one part of the heat transfer medium is conducted over both heat sources and another part of the heat transfer medium is conducted solely over the second heat source. Reference is made in this regard to DE 43 24 371 A1 and to DE 44 46 152 A1.

SUMMARY OF THE INVENTION

The invention has as its object to simplify the control of the circuits.

This object is attained according to the invention in that the further pump has a radial impeller axially displaceable in a pump housing with radial forwarding vanes arranged on its one face and also a pump inlet arranged axially in front of this face and two radial pump outlets spaced apart from each other in the axial direction of the impeller, and that the pump outlet axially remote from the pump inlet communicates with the inlet side of the first heat source, and the pump outlet axially nearer to the pump inlet communicates with the inlet side of the second heat source.

The invention rests on the general concept of rendering superfluous the valves which were heretofore customary for the control of the heat transfer circuits, by means of a particular construction of the further pump, which in the invention is constituted as a multi-hydrofunction pump. The axially displaceable radial impeller assumes different positions relative to the radial pump outlets when only the first pump, or only the second pump, or both pumps, are operating, wherein in the last case the position of the radial impeller also depends on the delivery rates of the two pumps relative to each other. When only the further pump is operating, only a little heat transfer medium can flow out from the further pump to the first pump, independently of the axial position of the radial impeller. The preponderant fraction of the heat transfer medium flows out to the second heat source via the pump outlet axially nearer to the pump inlet. At the same time, there arises at the face of the radial impeller having the forwarding vanes a dynamic reduced pressure which "pulls" the radial impeller axially into a position adjacent to the pump outlet to the second heat source, in which position the radial impeller can particularly effectively maintain the small circuit.

When only the first pump is operating, the radial impeller is pushed into a position distanced from the pump inlet, with extensive release of the pump outlet leading to the first heat source.

When both pumps are operating, the radial impeller assumes a middle position which depends on the relationship of the pressures arising at the pump outlets and correspondingly on the relative delivery rates of the two pumps.

According to a first embodiment of the invention, the radial impeller can be arranged to be axially displaceable on a drive shaft.

Instead of this it is also possible to arrange the drive shaft to be axially displaceable together with the radial impeller, where if necessary an associated drive motor, as a rule an electric motor, can be displaced with the shaft.

As for the rest, the pump housing can enclose the radial impeller with more or less great radial play, so that the two pump outlets communicate with each other independently of the axial position of the radial impeller.

According to a particularly preferred embodiment, the radial impeller or a portion thereof can have a shape which can change in dependence on temperature, so that at higher temperatures of the heat transfer medium a bypass is always provided between the inner space of the pump housing on the front side and the inner space of the pump housing on the back side. The variable shape can be attained by shape memory alloys, as described hereinafter.

According to a further preferred embodiment, the radial impeller can cooperate with a stop which changes its shape or position in dependence on temperature, this stop, below a transition temperature or a lower temperature threshold value, permitting an axial displacement of the radial impeller by flow-dynamic forces between two end positions, in which the radial impeller supplies the heat transfer medium either preponderantly to the one radial pump outlet, or preponderantly to the other radial pump outlet, and wherein the stop, above the transition temperature or an upper temperature threshold value, brings the radial impeller into such an axial position, or restricts the axial mobility of the radial impeller in such a manner, that at least a partial stream of the heat transfer medium flows into the radial pump outlet more distant from the pump inlet.

Such a temperature-dependent change of the axial displacement path of the radial impeller can take place by means of bimetal springs or—in a particularly appropriate manner—by a spring made of shape memory alloy.

BRIEF DESCRIPTION OF THE DRAWINGS

Reference is made regarding further preferred features of the invention to the claims and also to the following explanation of the drawing, using which particularly preferred embodiments are described in more detail.

DETAILED DESCRIPTION OF THE INVENTION

Figure 1:
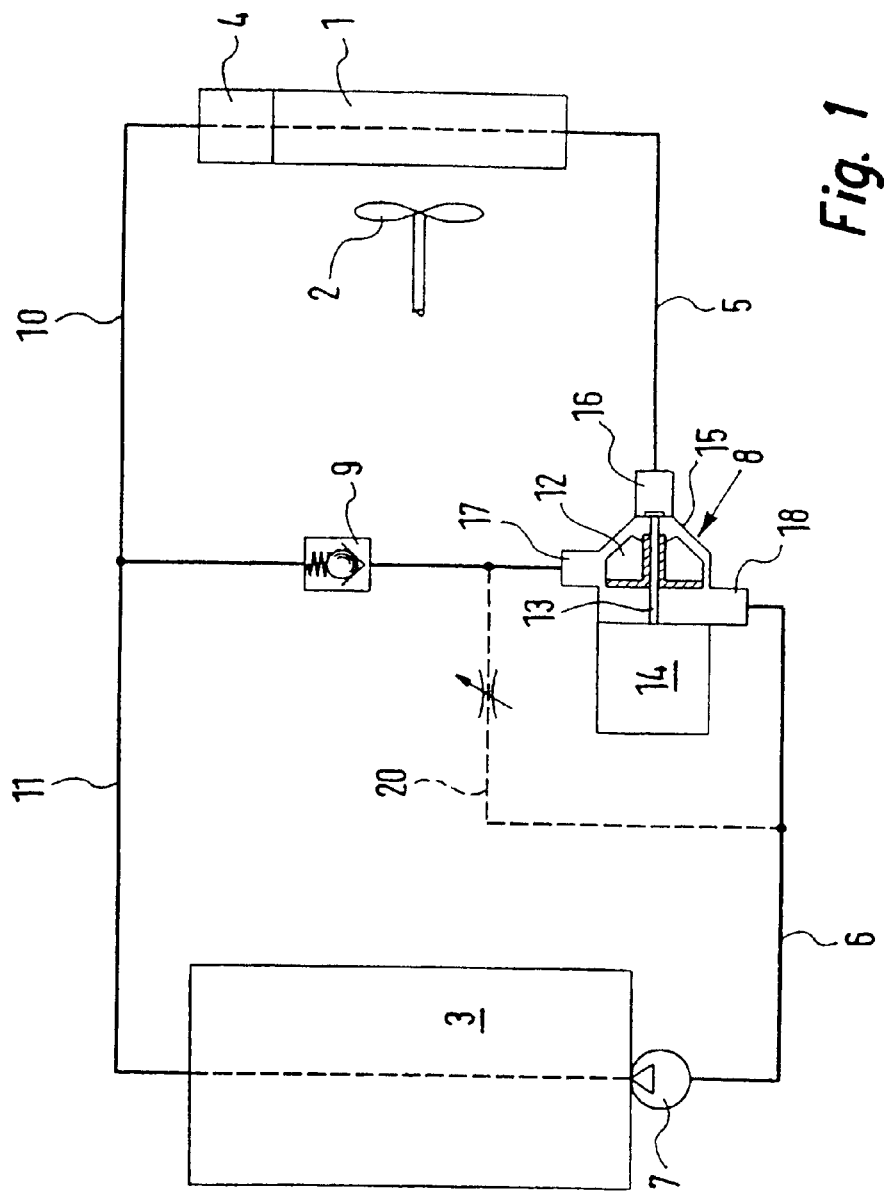
FIG. 1 shows a diagram of the heating system according to the invention, in the manner of a circuit diagram.

According to FIG. 1, a heat exchanger 1 operating as a heating member serves to heat the interior space of a motor vehicle (not shown). For this purpose, the said heat exchanger can be acted on by an air stream from a fan 2, and can be thermally coupled via a water circuit, whose water serves as the heat transfer medium, to an internal combustion engine 3 which drives the motor vehicle and which forms a first heat source, and also to a burner 4 which can be operated independently of the engine 3 and which forms a second heat source.

For this purpose, the outlet duct 5 of the heat exchanger 1 is connected firstly—in a manner described hereinbelow—to a return duct 6 which is connected to the intake side of a first water pump 7, the outlet side of which is connected to the engine 3. On the other hand, the outlet duct 5 is connected, via a second pump 8 and also a check valve 9 to prevent a flow toward the pump 8, to an inlet duct 10 which leads to the water inlet of the burner 4, and in addition is connected via a supply duct 11 to a water outlet of the internal combustion engine 3.

Figure 2:
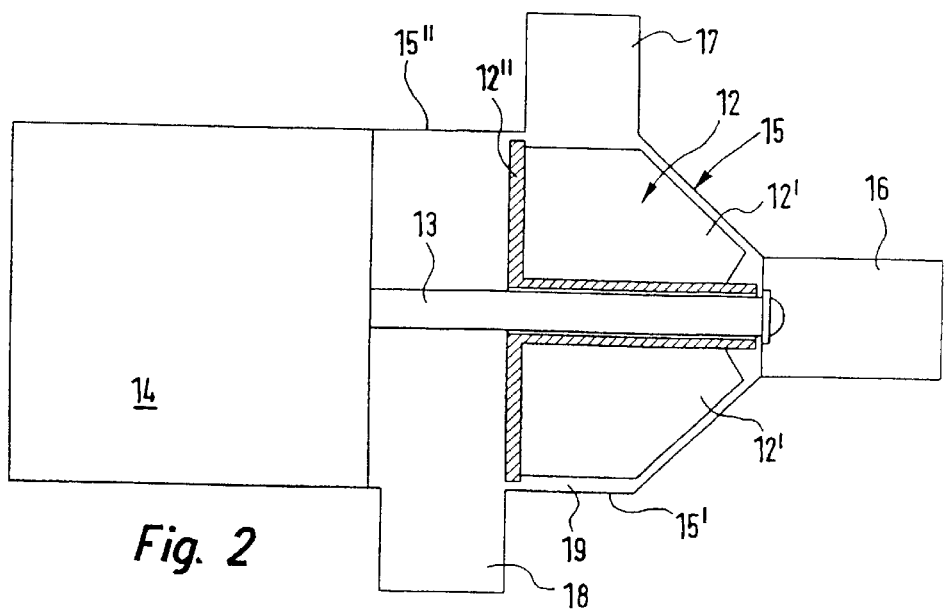
FIG. 2 shows an axial section of the further pump, the radial impeller being positioned near the pump outlet nearer the pump inlet.
Figure 3:
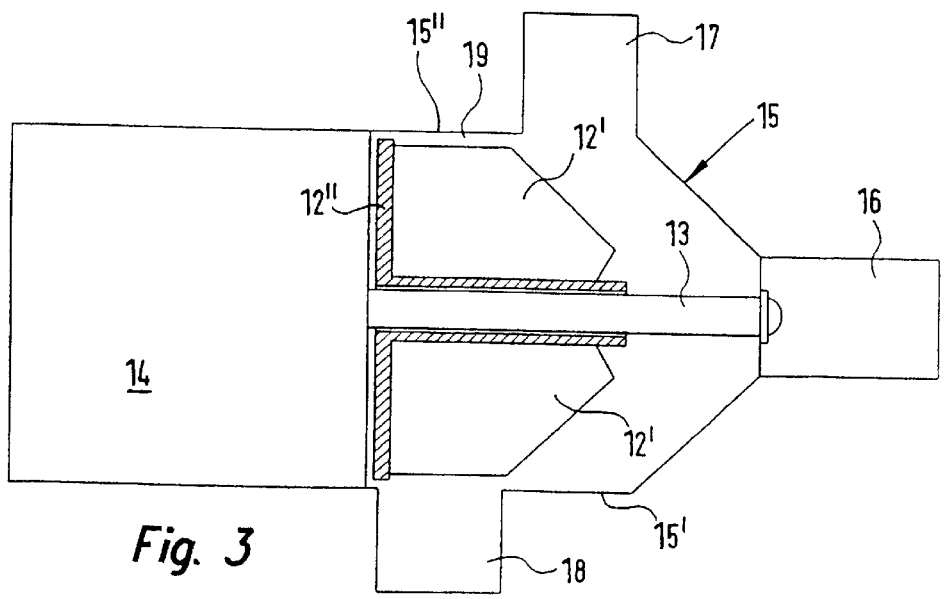
FIG. 3 shows a diagram corresponding to FIG. 2 but in which the radial impeller is axially distanced from the pump inlet to the maximum extent.

The pump 8, which is shown more accurately in FIGS. 2 and 3, operates as a flow-dynamic pump with a radial impeller 12 provided on its end side (right-hand side in FIGS. 2 and 3) with wing-like impeller vanes 12. This radial impeller 12 is arranged on a drive shaft 13 of an electric motor (or other drive) so as to be substantially fast to rotation but however axially displaceable.

A pump housing 15 receiving the radial impeller 12 has an inlet 16 which is connected to the outlet duct 5 of the heat exchanger 1 and which is arranged centrally of the radial impeller 12 and on the side of it provided with impeller vanes. The pump housing 15 furthermore has two radial outlets 17 and 18 which are arranged in different radial planes of the pump housing 15, the outlet 17 nearer the inlet 16 being connected to, or receiving, the check valve 9, and the outlet 18 remote from the inlet 15 being connected to the return duct 6.

The arrangement shown in FIGS. 1–3 functions as follows:

The case is first considered in which the engine 3 and correspondingly the water pump 7 driven by the engine 3 are not operating. When now the pump 8 is set in operation, water is forwarded from the inlet 16 to the outlets 17 and 18 in different proportions according to the axial position of the radial impeller 12 on the drive shaft 13. Due to hydrodynamic effects, a dynamic reduced pressure occurs on the side of the actively driven radial impeller 12, on its side having the impeller vanes 12', with the consequence that the radial impeller 12 is displaced on the shaft 13 into the right-hand axial end position, and the radial impeller 12 is practically effective only in the radial plane of the pump housing 15 assigned to the outlet 17. Correspondingly, the water taken up by the radial impeller 12 is quite preponderantly conducted to the outlet 17. As a result, the so-called small water circuit which runs from the outlet 17 to the burner 4 and subsequently to the heat exchanger 1 and then to the input 16 of the pump 8 is maintained by the pump 8. The heat produced by the burner 4 as it operates is in this manner completely supplied to the heat exchanger 1 and then, in the case of a motor vehicle, particularly with the fan 2 switched on, can be conducted to a motor vehicle interior to be heated. This manner of operation is provided in a motor vehicle when the heating system shown is to be used as an auxiliary heater when the vehicle engine is stopped.

The case will now be considered in which the internal combustion engine 3 is running and accordingly drives the water pump 7. Furthermore, the pump 8 may be switched off. In this mode of operation, the so-called large circuit, leading from the engine 3 via the burner 4 and the heat exchanger 1 and via the pump 8 to the pump 7, is maintained by the water pump 7. Because the pump 7 is operating, a more or less strongly reduced pressure is produced within the pump housing 15 of the pump 8 on the end side of the radial impeller 12 remote from the inlet 16, and causes the radial impeller 12 to be entrained in a direction leading away from the inlet 15, so that the (stationary) pump 8 has a minimum flow resistance with respect to the flow path leading from the inlet 16 to the outlet 18. This mode of operation with the large water circuit can serve, on the one hand, to supply the exhaust heat of the engine 3 to the heat exchanger 1 and there, particularly with the fan 2 switched on, be used for the heating of a motor vehicle interior. Moreover the burner 4 can be switched on when the large water circuit is operating, and its heat can on the one hand increase the heat delivery of the heat exchanger and on the other hand can serve to bring the engine 3 quickly to the operating temperature, i.e., the burner 4 operates as a so-called supplementary heater with respect to the engine 3.

It can be appropriate, particularly when the motor vehicle has become thoroughly cold, to allow the further pump 8 to operate actively during operation of the burner 4 when the engine 3 is running and accordingly the pump 7 is operating. According to the rpm of the vehicle engine, the water pump 7 operates with greater or smaller delivery. The relationship of the deliveries of the pumps 7 and 8 correspondingly changes. With a low delivery of the pump 7, only an extremely small reduced pressure is present at the outlet 18 of the pump 8. Thus the comparatively large dynamic reduced pressure arising at the vane side of the radial impeller 12 when it is in forwarding operation can displace the radial impeller 12 toward the inlet 16, so that the pump 8 conducts a large proportion of the water coming from the heat exchanger 1 on the short path via the check valve 9 to the burner 4, and a correspondingly large amount of heat is available for the vehicle interior. When the engine 3 runs faster, the pump 7 operates with an increased delivery, so that a stronger reduced pressure occurs at the outlet 18, and the radial impeller 12 assumes an axial position between its axial end positions. The water coming from the heat exchanger 1 can thereby be divided between the outlets 17 and 18 of the pump 8 analogously to the ratio of the deliveries of the pumps 7 and 8, so that at the same time an increased proportion of the exhaust heat of the engine 3 is supplied to the heat exchanger 1.

In FIGS. 2 and 3, the pump housing 15 encloses the radial impeller 12 with a very narrow annular gap 19. It is also basically possible for this annular gap 13 to be made wider. It is thus attained that the radial impeller 12, even in its position taken up in FIG. 2, delivers a larger proportion of the water entering via the inlet 16 to the outlet 18. In this manner, a certain preheating of the engine 3 can be attained when the burner 4 and also the pump 8 are operating, and indeed even when the engine 3 and hence the water pump 7 are stopped.

Figure 4:
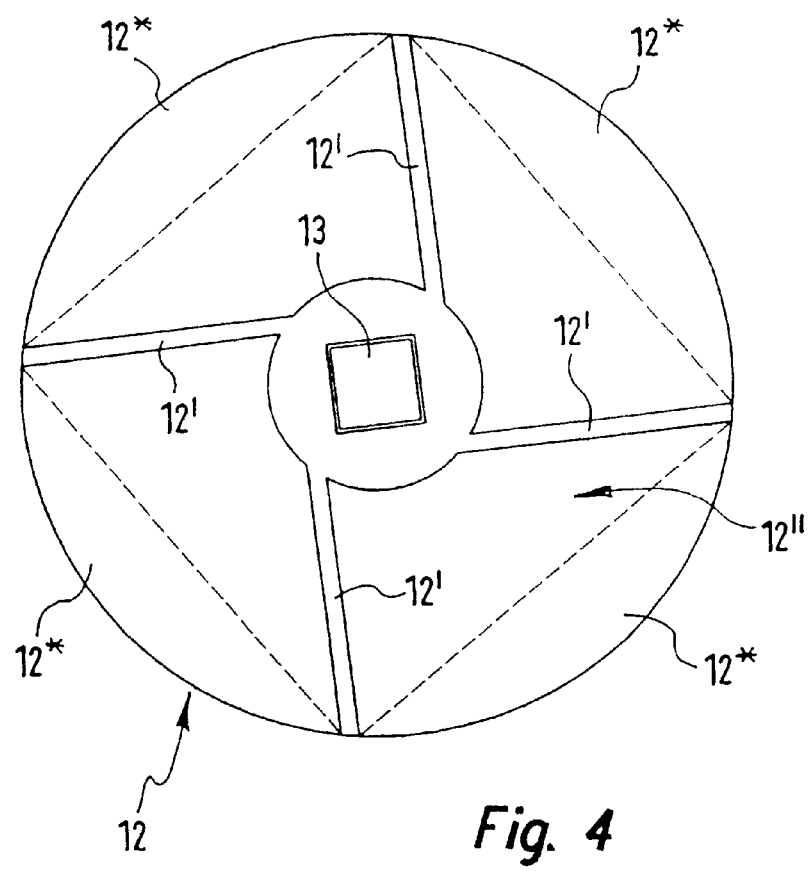
FIG. 4 shows an axial view of a preferred embodiment of a radial impeller of a pump.

FIG. 4 now shows a possibility of altering the cross section of the annular gap 19 in dependence on the temperature of the water running into the pump housing 15 via the inlet 16.

The radial impeller 12 shown in FIG. 4 in axial view toward the impeller vanes 12' has a disk-shaped back wall 12" which is made of a shape memory alloy and is constituted such that edge sections 12* of the back wall 12" swing down as soon as the temperature of the surroundings exceeds a predetermined transition temperature. As soon as the temperature has fallen sufficiently far below this transition temperature again, the back wall 12" again assumes its disk shape. In this manner, the provision of a bypass with larger cross section between the front and back sides of the radial impeller 12 is attained at a higher water temperature in every case.

This leads to the result that, when the burner 4 is in operation and the pump 8 is running, with the engine 3 stopped and the pump 7 correspondingly stopped, at first practically only the small water circuit is maintained and the heat produced by the burner 4 is virtually completely available for heating a vehicle interior. As soon as the water temperature exceeds the said transition temperature, which can be suitably preset by the choice of the shape memory alloy, this means that the vehicle interior could have been heated to a certain extent, and now the heat of the burner can be taken off for additional heating of the engine, without detriment to the comfort of the occupants, in order to shorten the warming-up phase of the engine 3 in subsequent traveling operation.

In operation, a radial impeller 12 constituted according to FIG. 4 corresponds to a controllable bypass duct 20, as indicated with dashed lines in FIG. 1 between the outlets 17 and 18 of the pump 8.

It is basically possible to provide a bypass duct 20 of this kind, if necessary with temperature-dependent control of its throttle resistance.

In contrast to this, a markedly reduced assembly cost can however be ensured by means of the radial impeller 12 which changes shape in dependence on temperature.

Figure 5:
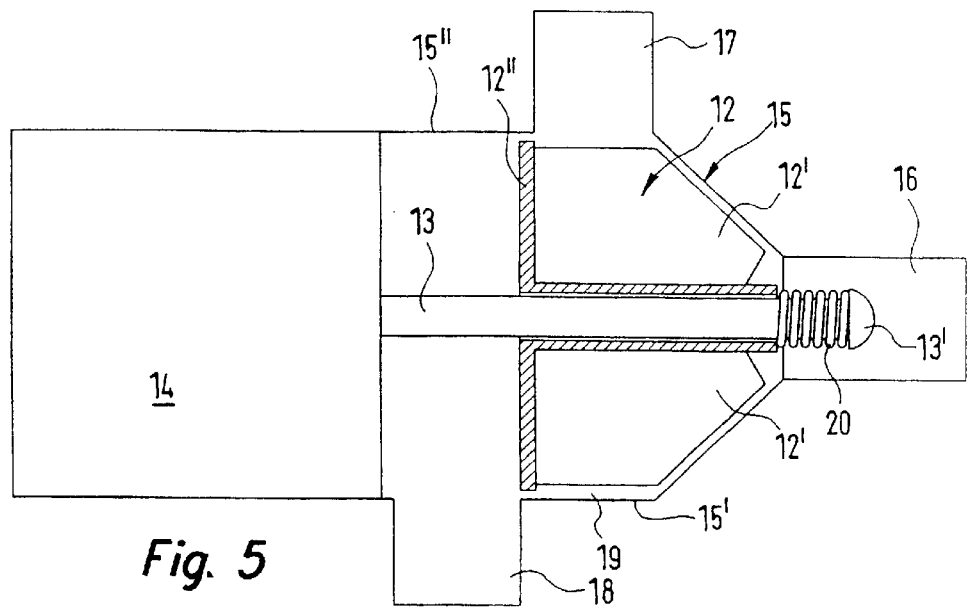
FIG. 5 shows a diagram corresponding to FIG. 2 of a modified embodiment.
Figure 6:
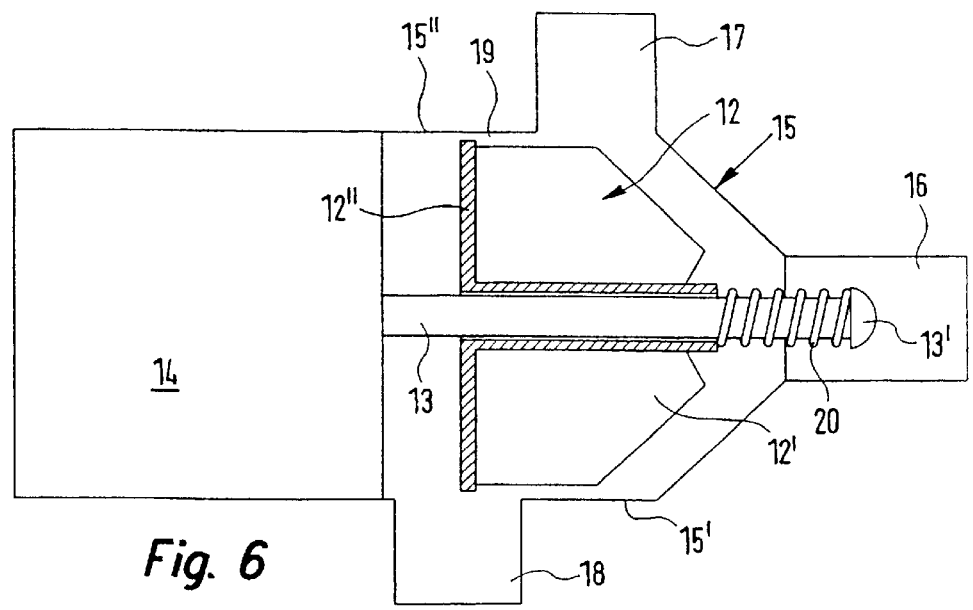
FIG. 6 shows a particular operating state of the embodiment according to FIG. 5.

The embodiment of FIGS. 5 and 6 differs from the embodiment shown in FIGS. 2 and 3 substantially in that the shaft 13 driving and carrying the radial impeller 12 is extended somewhat into the inlet 16. In addition, a coil compression spring 20 of shape memory alloy is arranged on the shaft 13, between an abutment 13' arranged at the free end of the shaft 13 and the end face of the radial impeller 12 facing the said abutment 13'. The spring 20 is constituted such that it assumes its state shown in FIG. 5, with a small axial length, below a transition temperature, for example 60° C.

If on the other hand the transition temperature is exceeded, the coil compression spring 20 transforms into its other state, in which, according to FIG. 6, it has, or tends to assume, a large axial length, with the consequence that the radial impeller 12 is kept away from the abutment 13' or is pushed away into the position of FIG. 6.

As long as the temperature of the heat transfer medium flowing via the duct 5 (see FIG. 1) into the inlet 16 is below the transition temperature, the embodiment of FIGS. 5 and 6 behaves in the same manner as was described hereinabove using FIGS. 1–3.

When only the pump 8 operates, the radial impeller 12 assumes, due to hydrodynamic effects, its right-hand end position shown in FIG. 5, in the region of the right-hand outlet 17 in FIG. 5, so that the heat transfer medium coming from the inlet 16 is forwarded practically exclusively into the outlet 17.

When on the other hand the motor 14 of the pump 8 is stopped and only the pump 7 (see FIG. 1) operates, the radial impeller 12 is displaced toward the left in FIG. 5, into the left-hand end position, due to hydrodynamic effects, so that the heat transfer medium coming from the inlet 16 is forwarded practically completely into the outlet 18.

When both pumps 7 and 8 are operating, the radial impeller 12 will on the other hand assume an axially middle position between the two end positions stated hereinbefore, with the consequence that the heat transfer medium coming from the inlet 16 is divided between the outlets 17 and 18, the ratio of the amounts flowing into the outlets 17 and 18 being dependent on the ratio of the rpms of the pumps 7 and 8, and the radial impeller 12 being axially displaced analogously to the rpm ratio.

When on the other hand the transition temperature is exceeded, the radial impeller 12 is prevented by the coil compression spring 20 from approaching the abutment 13' beyond the axial position shown in FIG. 6. If the radial impeller 12 should assume a closer position to the abutment 13' at the moment that the transition temperature is exceeded, the radial impeller 12 is pushed by the spring 20 into the position of FIG. 6.

The position of FIG. 6 will thereby always be assumed when only the pump 8 operates actively. When the transition temperature has been exceeded, the heat transfer medium coming from the inlet 16 is thus also supplied at least in a greater proportion to the outlet 18, even when only the pump 8 is operating.

When on the other hand only the pump 7 operates actively, the radial impeller 12 is pushed by hydrodynamic effects away from the facing end of the spring 20 and is brought into its left-hand end position in FIG. 6, so that practically the whole of the heat transfer medium coming from the inlet 16 reaches the output 18.

When both pumps 7 and 8 operate, the radial impeller 12 assumes a position between the said left-hand end position and the position shown in FIG. 6, in dependence on the ratio of the deliveries of the two pumps 7 and 8.

According to a preferred embodiment of the invention, the pump housing 15 can if necessary be constructed in two parts with housing parts 15' and 15" which are rotatable against each other with respect to the axis of the shaft 13. In this manner, there is the possibility of arranging the outlets 17 and 18 in an optional rotary position relative to each other, so that the pump 8 is suitable for very varied mounting conditions in vehicles.

The outlets 17 and 18 do not have to be arranged exactly radial of the axis of the shaft 13. These outlets 17 and 18 can rather also open somewhat tangentially into the peripheral wall of the pump housing 15, with the outlets 17 and 18 branching out from the housing 15 in the direction of revolution of the radial impeller 12.

The possibility furthermore exists of arranging the radial impeller 12 on a helical guide on the shaft 13, or of providing a screw coupling between the motor 14 and the radial impeller 12, so that the radial impeller 12 performs a rotation in one or other direction when displaced axially relative to the shaft 13 or the motor 14. An axial force, dependent on the slope of the helical guide, is produced in this manner when the radial impeller 12 is operating, and can oppose the flow-dynamically produced axial forces or can support these forces. The axial position of the radial impeller 12 on the shaft 13 can thereby be additionally altered by means of rpm changes of the electric motor 14 driving the radial impeller 12.

Finally, the axial end positions of the radial impeller 12 can be constituted as displaceable or adjustable. When, e.g., the radial impeller 12 has a right-hand end position displaced toward the left, in contrast to what is shown in FIG. 2, a larger proportion of the forwarded heat transfer medium will be conducted, with the radial impeller 12 operating in the right-hand end position, to the pump outlet 18 and thus to the internal combustion engine 3 for heating it up. The degree of engine preheating can be preset by corresponding adjustment of the right-hand end position of the radial impeller 12, where basically all positions between "no engine preheating" and "major engine preheating" can be set.

What is claimed is:

1. A heating system in which a heat exchange arrangement operating in the manner of a heating member is thermally couplable via a hydraulic heat transfer circuit to a first heat source and to a second heat source, wherein a control arrangement is changeable over, in dependence on an operating state of a first pump allocated to said first heat source, between a first state, in which a heat transfer medium or at least a greater portion of said heat transfer medium is conducted over said first and second heat sources, and a second state, in which said heat transfer medium is conducted by a second, hydrodynamic pump, only or preponderantly over said second heat source, wherein said second pump has, axially displaceable in a pump housing, a radial impeller with radial impeller vanes arranged on one face of said radial impeller and a pump inlet arranged axially in front of said face and two radial pump outlets, mutually spaced apart in an axial direction of said radial impeller, and wherein a first pump outlet of said two radial pump outlets that is axially remote from said pump inlet communicates with an inlet side of said first heat source, and a second pump outlet of said two radial pump outlets that is axially nearer to said pump inlet communicates with an inlet side of said second heat source.

2. The heating system according to claim 1, wherein said radial impeller has a shape that is changeable in dependence on temperature, such that a connecting path with a temperature-dependent cross section is present between a space on one end side of said radial impeller and a space on another end side of said radial impeller.

3. The heating system according to claim 2, wherein a disk-shaped portion of the radial impeller comprises at least regionally a shape memory alloy.

4. The heating system according to claim 1, wherein said radial impeller has a variable diameter.

5. The heating system according to claim 1, wherein said radial impeller cooperates with a stop whose shape or position changes in dependence on temperature, said stop, below a transition temperature or below a lower temperature threshold value, permitting an axial displacement of said radial impeller by flow-dynamic forces between two end positions, in which said radial impeller supplies said heat transfer medium either preponderantly to said second radial pump outlet, or preponderantly to said first radial pump outlet, and wherein a stop, above said transition temperature or an upper temperature threshold value, brings said radial impeller into such an axial position or restricts axial mobility of said radial impeller, such that at least a partial flow of said heat transfer medium flows into said first radial pump outlet.

6. The heating system according to claim 5, wherein a spring comprising shape memory alloy is arranged as said stop.

7. The heating system according to claim 6, wherein said spring of shape memory alloy comprises a coil spring arranged on a shaft driving and carrying said radial impeller axially between an abutment on a shaft side and an end of said radial impeller facing said abutment.

8. The heating system according to claim 1, wherein said radial impeller is screw-displacably arranged on a shaft serving to drive said radial impeller, such that an axial force is operative between said shaft and said radial impeller when said radial impeller is driven.

9. The heating system according to claim 1, wherein said pump housing is divided between said two outlets such that said two partial housings are rotatable relative to each other with respect to an axis of said radial impeller.

10. The heating system according to claim 1, wherein said radial impeller operates in a first axial end position in a radial plane containing an axis of said second pump outlet or in a second axial end position operates in a radial plane containing an axis of said first pump outlet.

11. The heating system according to claim 10, wherein said radial impeller operates in positions between said first and second axial end positions in a radial plane containing an axis of a first or second pump outlet.

12. The heating system according to claim 1, wherein said radial impeller has axial end positions that are adjustable or displaceable.

13. The heating system according to claim 1, wherein said pump housing has an increasing internal diameter in a direction of the first or the second pump outlets, such that a widening annular gap arises between said radial impeller and said pump housing on axial displacement of said radial impeller from an initial position in a direction of the fat or second pump outlet.

14. The heating system according to claim 1, for motor vehicles.

15. The heating system according to claim 1, wherein said hydraulic heat transfer circuit comprises a water circuit.

16. The heating system according to claim 1, wherein said first heat source comprises an internal combustion engine serving to drive said motor vehicle.

17. The heating system according to claim 1, wherein said second heat source comprises a burner operable independently of said first heat source.

* * * * *